UNITED STATES PATENT OFFICE.

LUDWIG K. BÖHM, OF NEW YORK, N. Y., ASSIGNOR TO THE AMERICAN INCANDESCENT LIGHT COMPANY, OF WEST VIRGINIA.

COMPOSITION OF MATERIAL FOR INCANDESCENT GAS-LIGHTS.

SPECIFICATION forming part of Letters Patent No. 572,101, dated December 1, 1896.

Application filed November 5, 1895. Renewed September 28, 1896. Serial No. 607,367. (No specimens.)

*To all whom it may concern:*

Be it known that I, LUDWIG K. BÖHM, a subject of the Emperor of Germany, and a resident of New York city, in the county and State of New York, have invented certain new and useful Improvements in a Composition of Material for Incandescent Gas Devices or Hoods, of which the following is a full and exact description.

My invention relates to improvements in a composition of incandescent material from which incandescent devices or hoods are made for use in connection with gas.

The invention also relates to a composition for the manufacture of incandescent devices or hoods of that class which are made entirely of mineral substance and without a cotton stocking or the like.

Heretofore such materials consisted simply of the refractory earthy oxids, such as calcium oxid, magnesium oxid, zirconia, thoria, &c., but such materials are alone not well adapted for the purpose, although they are so-called "incandescent" oxids. These incandescent oxids are capable of becoming nicely incandescent, but they lack the quality of radiating the light. They are brilliant to look at, but at a small distance from the incandescent body made of such material there is not sufficient light because there is no diffusion of the light when such an incandescent material alone is employed.

Further compositions have been suggested for incandescent material regardless of the chemical properties of the single substances or of the compositions owing to the lack of experience in and knowledge of the subject.

I have now discovered that a composition in order to constitute a perfect incandescent material must possess, above all, four principal qualities which are imparted by suitable substances. In order to insure incandescence, the composition must contain one of the incandescent materials. In order to insure durability, the composition must contain indestructible and involatilizable body. In order to insure the radiation of the light, the composition must contain a substance or substances capable of diffusing the light, and in order to concentrate the heat of the gas within the incandescent device the composition must contain heavy materials, so that the manufactured incandescent device will have a good weight in proportion to its size. The above is the result of exhaustive scientific research and careful experimenting, and I claim that these requisites for a perfect incandescent gas-light have first been discovered by me.

My novel composition for incandescent material consists of magnesium oxid, powdered porcelain or the components thereof, powdered asbestos, sulfate of chromium, lime, sulfate of barium, thoria, and zirconia. In some instances minium is used in place of sulfate of barium or a mixture of both. The magnesium is the so-called "incandescent" material. The porcelain and the powdered asbestos give durability. The sulfate of chromium and the oxid of calcium give the diffusion of the light. The sulfate of barium or minium give the desired weight to the incandescent device, and the thoria or zirconia help to diffuse the light and give a desirable and agreeable white or yellowish light. The proportions in which I prefer to employ the components are fifteen parts of magnesium oxid, seven parts of porcelain body, two parts of powdered asbestos, 1.5 parts of sulfate of chromium, one part of lime, three to five parts of sulfate of barium or minium or a mixture thereof, and 1.5 parts of thoria or zirconia or a mixture thereof. These proportions are varied for the different kinds of illuminating-gas in connection with which they are used. Pure thoria gives in the above composition a white light. Pure zirconia gives a mellow, golden, yellowish light, and by employing both in various proportions any tint of light between pure white and golden-yellow can be obtained. The sulfate of chromium is employed because oxid of chromium is disagreeable to the eye and hurts the same, while the sulfate of chromium does not hurt the eye and still gives the desirable quality of diffusion and intensity to the light.

The above materials are mixed together, preferably in form of dry powder. Then the mixture is rubbed in an organic binder, such as sugar solution, a solution of gun-cotton, or the like, in order to obtain a plastic mass which permits of shaping the incandescent devices in the usual way. The incandescents are then dried and baked in suitable ovens in the usual manner, when they will be ready for use.

Having thus described my invention, what I claim therein as new, and desire to secure by Letters Patent, is—

A composition for incandescent material consisting of magnesium oxid, porcelain body, powdered asbestos, sulfate of chromium, oxid of calcium, sulfate of barium or minium, and thoria and zirconia, substantially in the proportions specified.

In testimony whereof I have hereunto set my hand in the presence of two subscribing witnesses.

LUDWIG K. BÖHM.

Witnesses:
M. FROEHLICH,
J. F. CARROLL.